United States Patent
Hirasawa et al.

(10) Patent No.: US 9,944,001 B2
(45) Date of Patent: Apr. 17, 2018

(54) INSERT MOLDED ARTICLE, INSERT MOLDING METHOD, AND INSERT MOLDING APPARATUS

(71) Applicants: Kazuo Hirasawa, Iida (JP); Kenji Tamura, Nissin (JP)

(72) Inventors: Kazuo Hirasawa, Iida (JP); Kenji Tamura, Nissin (JP)

(73) Assignees: TOYOTA JIDOSHA KABUSHIKI KAISHA, Toyota-Shi, Aichi-ken (JP); TOKAI KOGYO CO., LTD., Obu, Aichi-Pref, (JP)

( * ) Notice: Subject to any disclaimer, the term of this patent is extended or adjusted under 35 U.S.C. 154(b) by 854 days.

(21) Appl. No.: 14/090,291

(22) Filed: Nov. 26, 2013

(65) Prior Publication Data
US 2014/0154443 A1 Jun. 5, 2014

(30) Foreign Application Priority Data
Nov. 30, 2012 (JP) ................................. 2012-262918

(51) Int. Cl.
B29C 65/78 (2006.01)
B29C 45/14 (2006.01)

(52) U.S. Cl.
CPC .. B29C 45/14549 (2013.01); *B29C 45/14065* (2013.01); *B29C 45/14819* (2013.01); *B29C 2045/14139* (2013.01); *B29C 2045/14163* (2013.01); *B29C 2045/14606* (2013.01); *Y10T 428/1352* (2015.01)

(58) Field of Classification Search
CPC .... B29C 45/14549; B29C 2045/14606; B29C 2045/14163; B29C 45/14819; B29C 2045/14139; B29C 45/14065; B29C 65/7814; B29C 65/7808
See application file for complete search history.

(56) References Cited

U.S. PATENT DOCUMENTS

| 4,419,796 | A | * | 12/1983 | Broden | B29C 45/14065 86/52 |
|---|---|---|---|---|---|
| 5,372,767 | A | * | 12/1994 | Zimmermann | B29C 45/14221 264/154 |
| 5,895,618 | A | * | 4/1999 | Schwab | B29C 45/14065 264/155 |
| 2002/0190430 | A1 | * | 12/2002 | Fujiwara | B29C 45/14065 264/279 |
| 2004/0227272 | A1 | * | 11/2004 | Saito | B29C 45/14065 264/259 |
| 2005/0227036 | A1 | | 10/2005 | Takanashi | |

(Continued)

FOREIGN PATENT DOCUMENTS

| CN | 1715030 A | 1/2006 |
|---|---|---|
| JP | 2004-299369 A | 10/2004 |

(Continued)

*Primary Examiner* — Yogendra N Gupta
*Assistant Examiner* — Emmanuel S Luk
(74) *Attorney, Agent, or Firm* — Sughrue Mion, PLLC

(57) ABSTRACT

An insert molding apparatus includes a forming die in which a first part is arranged, and that molds resin such that a portion of the first part is exposed; and a first mounting part that is arranged at a portion where the first part is exposed, and that has a passage that passes through a space in the forming die into which the molten resin is supplied and a portion where the first part is arranged.

6 Claims, 4 Drawing Sheets

(56) References Cited

U.S. PATENT DOCUMENTS

| | | | |
|---|---|---|---|
| 2006/0001192 A1 | 1/2006 | Oohashi et al. | |
| 2006/0210735 A1* | 9/2006 | Colombo | B29C 45/14336 |
| | | | 428/34.1 |
| 2008/0026094 A1* | 1/2008 | Dettinger | B29C 45/14549 |
| | | | 425/542 |
| 2008/0054517 A1* | 3/2008 | Yamamoto | B29C 45/14549 |
| | | | 264/219 |
| 2010/0132190 A1* | 6/2010 | Grosso | B29C 45/14065 |
| | | | 29/841 |
| 2010/0258974 A1* | 10/2010 | Wallace | B29C 33/0044 |
| | | | 264/262 |
| 2012/0180608 A1* | 7/2012 | Gibson | B29C 45/14549 |
| | | | 81/489 |
| 2013/0102168 A1 | 4/2013 | Kobayashi et al. | |
| 2014/0070454 A1* | 3/2014 | Ishikawa | B29C 45/14065 |
| | | | 264/279 |
| 2014/0339738 A1* | 11/2014 | Haupt | B29C 45/14065 |
| | | | 264/328.13 |
| 2015/0121708 A1* | 5/2015 | Holm | B25G 1/102 |
| | | | 30/340 |
| 2015/0306800 A1* | 10/2015 | Horst | B29C 45/14549 |
| | | | 174/72 A |
| 2016/0068130 A1* | 3/2016 | Benedetti | B60R 21/216 |
| | | | 24/293 |

FOREIGN PATENT DOCUMENTS

| JP | 2005-297387 A | 10/2005 |
|---|---|---|
| JP | 2012-028029 A | 2/2012 |

\* cited by examiner

INSERT MOLDED ARTICLE, INSERT MOLDING METHOD, AND INSERT MOLDING APPARATUS

INCORPORATION BY REFERENCE

The disclosure of Japanese Patent Application No. 2012-262918 filed on Nov. 30, 2012 including the specification, drawings and abstract is incorporated herein by reference in its entirety.

BACKGROUND OF THE INVENTION

1. Field of the Invention

The invention relates to an insert molded article in which a plurality of types of parts are used for specific insert parts, an insert molding method for manufacturing this insert molded article, and an insert molding apparatus used in this insert molding method.

2. Description of Related Art

Insert molding is known as a method for integrating a part with resin. In insert molding, a part is integrated with set resin by injecting molten resin around the part while the part is arranged inside of a forming die. For example, Japanese Patent Application Publication No. 2005-297387 (JP 2005-297387 A) describes a case for an electronic control unit as an insert molded article.

Also, Japanese Patent Application Publication No. 2012-28029 (JP 2012-28029 A) describes technology for preventing wrong assembly in a lever-type connector. With the lever-type connector described in JP 2012-28029 A, a wrong-assembly preventing protrusion that prevents wrong assembly of a wire cover is provided on the wire cover. The wrong-assembly preventing protrusion abuts against an arm of a lever when the wire cover is assembled in the opposite direction from the assembly direction of the lever. Wrong assembly of the wire cover is able to be detected by the wrong-assembly preventing protrusion abutting against the arm of the lever.

There are cases in which a plurality of types of parts are used for specific insert parts in an insert molded article. In such cases, when the specific insert parts are assembled in a forming die, it is possible that, of the specific insert parts, one type of insert part may be wrongly assembled in a location where a different type of insert part is supposed to be assembled. However, with conventional insert molding technology, no thought has been given to how to detect wrong assembly when the type of insert part is wrong. Therefore, it is difficult to determine whether a wrong part has been assembled or a correct part has been assembled, when there is only a small difference in appearance between different types of insert parts, for example.

SUMMARY OF THE INVENTION

The invention thus provides an insert molded article, an insert molding method, and an insert molding apparatus, in which wrong assembly of an insert part is able to be easily detected.

A first aspect of the invention relates to an insert molded article that includes a first part; and a resin case having a protruding portion that is formed exposing a portion of the first part, and is adjacent to a portion where the first part is exposed, and protrudes from a surface of the resin case.

A second aspect of the invention relates to a method for forming an insert molded article that includes a first part, and a resin case having a protruding portion that is formed exposing a portion of the first part, and is adjacent to a portion where the first part is exposed, and protrudes from a surface of the resin case. This method includes arranging the first part in a forming die; arranging a mounting part that has a passage that passes through a cross-section thereof, so as to cover a portion where the first part is exposed from the resin case and such that the passage is blocked off by the first part; and forming the resin case by pouring molten resin into the forming die.

A third aspect of the invention relates to an insert molding apparatus that includes a forming die in which a first part is arranged, and that molds resin such that a portion of the first part is exposed; and a first mounting part that is arranged at a portion where the first part is exposed, and that has a passage that passes through a space in the forming die into which the molten resin is supplied and a portion where the first part is arranged.

According to these aspects it is possible to easily determine whether a wrong insert part has been assembled or a correct insert part has been assembled.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to FIGS. 1 to 7.

[Insert Molded Article]

Figure 1:
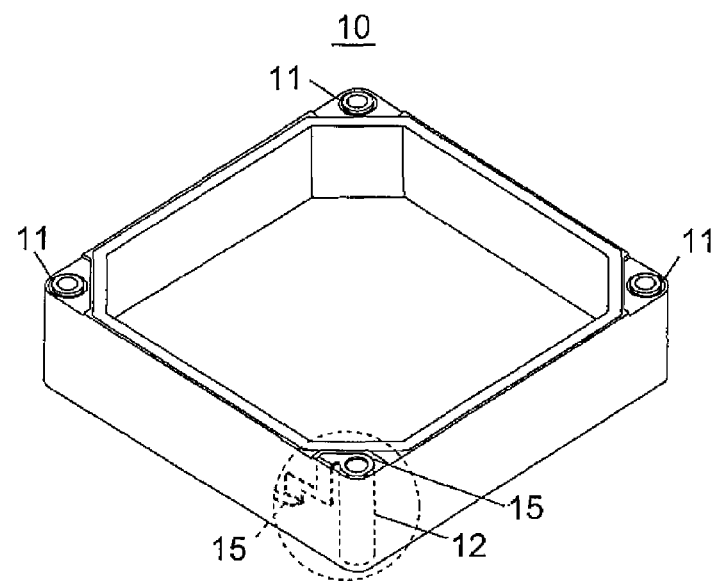
FIG. 1 is a perspective view of an insert molded article according to one example embodiment of the invention.

FIG. 1 is a perspective view of an insert molded article 10 according to one example embodiment of the invention. The insert molded article 10 in this example embodiment is a case for an electronic control unit (ECU). The insert molded article 10 is a case that is generally rectangular-shaped when viewed from above and is open on top, as shown in FIG. 1. Insert nuts 11 and 12 are embedded, as specific insert parts (specific parts) for which a plurality of types of parts are used, in the insert molded article 10. The insert nuts 11 and 12 are embedded in each of four corners of the insert molded article 10. The electronic control unit is such that a lid member, not shown, that covers the opening of the insert molded article 10 is fixed by bolts that fasten to the insert nuts 11 and 12. Transparent insert parts in the area inside the broken line in FIG. 1 are indicated by broken lines. Insert parts other than the insert nuts 11 and 12 and a bus bar 15 that will be described later are omitted in FIG. 1.

Figure 2:
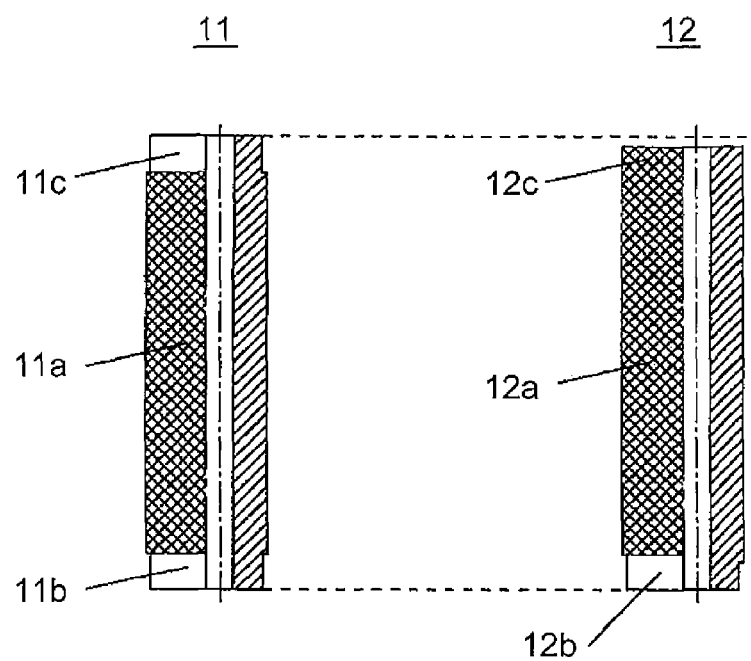
FIG. 2 is a side view and a sectional view of insert nuts.

FIG. 2 is a side view and a sectional view of the insert nuts 11 and 12. A first type of nut 11 and a second type of nut 12 are used for the four insert nuts 11 and 12 of the insert molded article 10. In FIG. 2, the insert nuts 11 and 12 are shown in a side view on the left side of the dashed line and in a sectional view on the right side of the dashed line. As shown in FIG. 1, in the insert molded article 10, there are three of the first type of nut 11, and one of the second type of nut 12. The first type of nut 11 and the second type of nut 12 are both formed in a generally cylindrical shape. The shape and dimensions of an end portion of the first type of nut 11 are different from the shape and dimensions of an end portion of the second type of nut 12.

Each of the first type of nuts 11 is embedded in the insert molded article 10 such that a portion of the first type of nut 11 is exposed. With the insert molded article 10, a recessed portion 130 and a protruding portion 131 that will be described later are formed around each of the first type of nut 11 (see FIG. 6). An upper end surface of the second type of nut 12 is overlapped by a metal bus bar 15, so the second type of nut 12 differs from the first type of nut 11 in that the upper end surface is not exposed. One end of the bus bar 15 has a through-hole through which a bolt can be inserted. The other end of the bus bar 15 is connected to a heat sink, not shown, provided on the insert molded article 10.

A portion of the first type of nut 11 except for a first end portion 11b and a second end portion 11c is a knurled portion 11a that has been knurled. An outer diameter of the knurled portion 11a is uniform in an axial direction. Also, with the first type of nut 11, the first end portion 11b and the second end portion 11c are the same shape and size. Each end portion 11b and 11c has a smooth cylindrical surface as a result of being cut (i.e., machined). An outer diameter of each end portion 11b and 11c is uniform in the axial direction, and is just slightly smaller than the outer diameter of the knurled portion 11a.

A portion of the second type of nut 12 except for a first end portion 12b is a knurled portion 12a that has been knurled. A second end portion 12c is part of the knurled portion 12a. An outer diameter of the knurled portion 12a is uniform in the axial direction. Also, the first end portion 12b has a smooth cylindrical surface as a result of being cut (i.e., machined). An outer diameter of the first end portion 12b is uniform in the axial direction, and is just slightly smaller than the outer diameter of the knurled portion 12a.

Continuing on, the first type of nut 11 and the second type of nut 12 will be compared. A height of the first type of nut 11 is higher than a height of the second type of nut 12 by an amount corresponding to the thickness of the bus bar 15. Also, the outer diameter of the knurled portion 11a of the first type of nut 11 is the same as the outer diameter of the knurled portion 12a of the second type of nut 12. The outer diameter of the knurled portions 11a and 12a is 9 mm, for example. Also, the outer diameter of the end portions 11b and 11c of the first type of nut 11 is the same as the outer diameter of the first end portion 12b (i.e., the cut end portion) of the second type of nut 12. The outer diameter of these cut end portions 11b, 11c, and 12b is 8.5 mm, for example. The outer diameter of the second end portion 12c of the second type of nut 12 is just slightly larger than the outer diameter of the cut end portions 11b, 11c, and 12b.

<Insert Molding Apparatus>

Continuing on, an insert molding apparatus 100 used to manufacture the insert molded article 10 will now be described.

Figure 3:
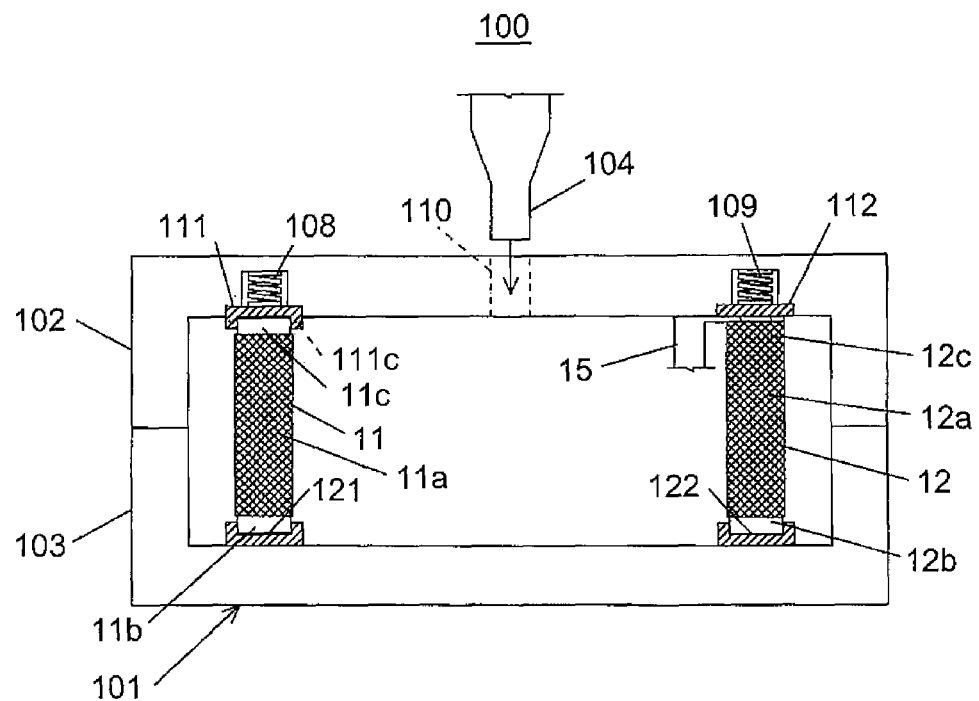
FIG. 3 is a block diagram schematically showing an insert molding apparatus.

FIG. 3 is a block diagram schematically showing the insert molding apparatus 100. The insert molding apparatus 100 includes a forming die 101 that has an upper die 102 and a lower die 103, an opening/closing mechanism, not shown, for opening and closing the forming die 101, a resin injecting device 104 for injecting molten resin inside the forming die 101, and a plurality of mounting members 111 and 112 (a so-called piece for insert molding), as shown in FIG. 3. A fill port 110 into which a nozzle of the resin injecting device 104 is inserted is formed in the forming die 101.

A first placement portion 121 for arranging the first type of nut 11 and a second placement portion 122 for arranging the second type of nut 12 are formed on a bottom surface of the lower die 103. The first placement portion 121 is provided in three locations, of the corner portions in four locations on the bottom surface of the lower die 103. The second placement portion 122 is provided in the remaining one location. The first placement portion 121 and the second placement portion 122 are all the same size and shape. The placement portions 121 and 122 are circular recessed portions. The end portions 11b and 11c of the first type of nut 11, as well as the first end portion 12b of the second type of nut 12, are able to fit into the placement portions 121 and 122.

The plurality of mounting members 111 and 112 are formed by a first mounting member 111 for the first type of nut 11, and a second mounting member 112 for the second type of nut 12. In the insert molding apparatus 100, there are three of the first mounting members 111, and one of the second mounting member 112.

Figure 4:
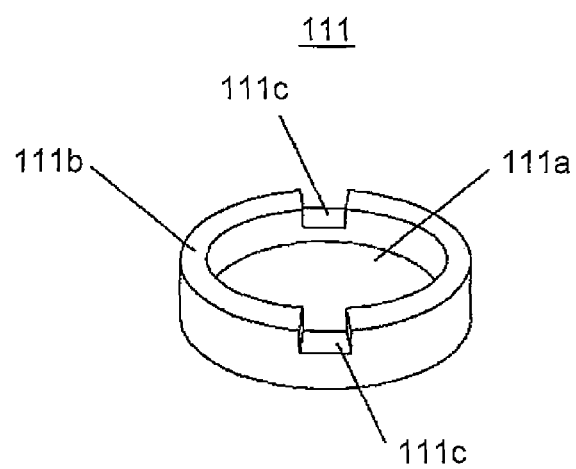
FIG. 4 is a perspective view of a first mounting member.
Figure 5:
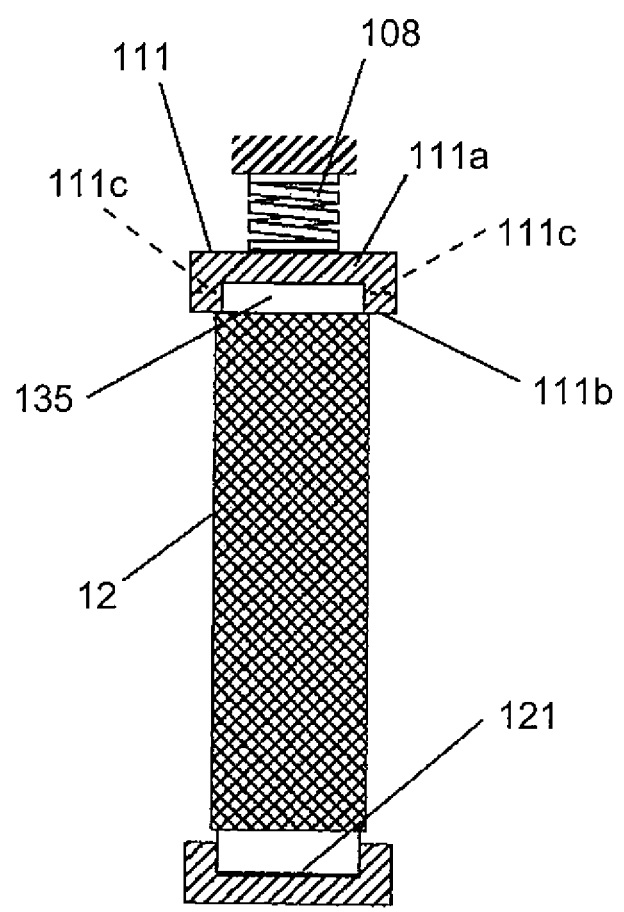
FIG. 5 is a side view of a state in which the first mounting member is attached to a second type of nut arranged on a first placement portion in the insert molding apparatus.

FIG. 4 is a perspective view of one of the first mounting members 111. Hereinafter, the first mounting members 111 and other portions may be referred to in the singular to simplify the description. FIG. 4 shows the first mounting member 111 upside down from the state in which it is shown in FIG. 3. FIG. 5 is a side view of a state in which the first mounting member 111 is attached to the second type of nut 12 arranged on the first placement portion 121 in the insert molding apparatus 100. The first mounting member 111 is mounted onto the first type of nut 11 that is assembled to the first placement portion 121, before molten resin is injected into the forming die 101. The first mounting member 111 holds down the first type of nut 11 using restoring force of an elastic member 108 (e.g., an elastic spring) attached to the first mounting member 111.

The first mounting member 111 includes a disk-shaped main body portion 111a that is pressed against the end surface of the first type of nut 11, and a cylindrical peripheral wall portion 111b that rises from the main body portion 111a, as shown in FIG. 4. The main body portion 111a and the peripheral wall portion 111b are integrated together. An inner diameter of the peripheral wall portion 111b is set so as able to fit the end portions 11b and 11c of the first type of nut 11, but not able to fit the second end portion 12c (i.e., the end portion that is part of the knurled portion 12a) of the second type of nut 12. More specifically, the inner diameter of the peripheral wall portion 111b is larger than the outer diameter of the end portions 11b and 11c of the first type of nut 11, and smaller than the outer diameter of the second end portion 12c of the second type of nut 12. When the main body portion 111a is pressed against the end surfaced of the first type of nut 11 by the elastic member 108, the peripheral wall portion 111b is positioned on the outside of the outer peripheral surface of the end portion 11c of the first type of nut 11.

Notches 111c are formed from a tip end side in the peripheral wall portion 111b. The depth of the notches 111c is lower than the height of the peripheral wall portion 111b. In this example embodiment, there are two notches 111c, but there may also be only one notch 111c or three or more notches 111c. Also, the depth of the notches 111c may be equal to the height of the peripheral wall portion 111b.

The second mounting member 112 is formed in a disk-shape. An outer diameter of the second mounting member 112 is larger than an outer diameter of the second end portion 12c of the second type of nut 12. The second mounting member 112 is mounted onto the second type of nut 12 that is assembled to the second placement portion 122, before molten resin is injected into the forming die 101. The second mounting member 112 holds down the second type of nut 12 via the bus bar 15, using restoring force of an elastic member 109 (e.g., an elastic spring) attached to the second mounting member 112.

According to the structure described above, when the first type of nut 11 is attached to the first placement portion 121, an inside surface of the main body portion 111a of the first mounting member 111 contacts the end surface of the first type of nut 11, as shown in FIG. 3. On the other hand, when the second type of nut 12 is attached to the first placement portion 121, a tip end surface of the peripheral wall portion 111b of the first mounting member 111 contacts the end surface of the second type of nut 12, as shown in FIG. 5. As a result, a gap for detecting wrong assembly (hereinafter, simply referred to as a "wrong-assembly detection gap") 135 is formed between the inside surface of the main body portion 111a of the first mounting member 111 and the end surface of the second type of nut 12. This wrong-assembly detection gap 135 is connected via the notches 111c to a space inside the forming die 101 that is injected with molten resin. In the insert molding apparatus 100, the wrong-assembly detection gap 135 that is connected via the notches 111c to the space inside the forming die 101 that is injected with molten resin is formed to the inside of the peripheral wall portion 111b only when the second type of nut 12, from among the first type of nut 11 and the second type of nut 12, is assembled to the first placement portion 121.

<Insert Molding Method>

Continuing on, an insert molding method using the insert molding apparatus 100 will be described. Hereinafter, a case in which the insert nuts 11 and 12 are correctly assembled will be described.

With this insert molding method, an placement process is performed in which the insert nuts 11 and 12 are arranged on the first placement portion 121 provided in three locations and the second placement portion 122 provided in one location on the bottom surface of the lower die 103 of the forming die 101. The first end portion 11b (or the second end portion 11c) of each of the first type of nuts 11 is fitted into the corresponding first placement portion 121. The first end portion 12b of the second type of nut 12 is fitted into the second placement portion 122. In this placement process, insert parts other than the insert nuts 11 and 12 are also assembled. The bus bar 15 is assembled in a predetermined position of the forming die 101 such that one end of the bus bar 15 overlaps with the upper surface of the second type of nut 12.

Continuing on, a die-closing process in which the upper die 102 is mounted onto the lower die 103 is performed. In this die-closing process, the first mounting member 111 is mounted onto the first type of nut 11, and the second mounting member 112 is mounted onto the second type of nut 12. In the closed forming die 101, the first mounting member 111 holds down the second end portion 11c (or the first end portion 11b) of the first type of nut 11, and the second mounting member 112 holds down the second end portion 12c of the second type of nut 12.

Next, an injection process in which a nozzle of the resin injecting device 104 is inserted into the fill port 110 and molten resin is injected into the forming die 101 from the resin injecting device 104 is performed. During this injection process, the position of the first type of nut 11 is maintained by the first mounting member 111, and the position of the second type of nut 12 is maintained by the second mounting member 112. Also, molten resin flows into the notches 111c of the peripheral wall portion 111b of the first mounting member 111.

After the injection process, a setting process in which the molten resin in the forming die 101 is set (i.e., solidified) is performed. Then after the resin in the forming die 101 has set, a die-opening process in which the forming die 101 is opened so that the upper die 102 separates from the lower die 103 is performed. In this die-opening process, the first mounting member 111 is removed from the first type of nut 11, and the first type of nut 11 is released from the state in which it is held down by the first mounting member 111. Also, the second type of nut 12 is also released from the state in which it is held down by the second mounting member 112. The insert molded article 10 shown in FIG. 1 is completed by performing the processes described above and the like.

Figure 6:
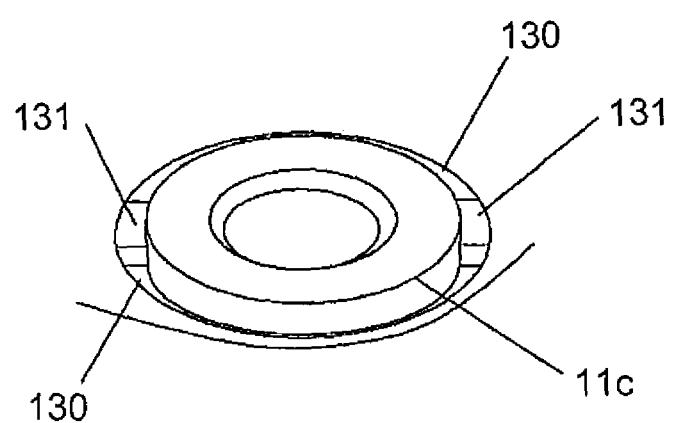
FIG. 6 is a perspective view of a corner portion of an insert molded article when an insert nut is not wrongly assembled.

FIG. 6 is a perspective view of a corner portion of the insert molded article 10 when the insert nuts 11 and 12 are not wrongly assembled (i.e., when the insert nuts 11 and 12 are assembled correctly). In the insert molded article 10, a portion of the second end portion 11c (or the first end portion 11b) of the first type of nut 11 is an exposed portion that is exposed on the outside. As shown in FIG. 6, the recessed portion 130 is formed as an impression of the peripheral wall portion 111b of the first mounting member 111 that is mounted to the first type of nut 11 when insert molding is performed. Furthermore, two of the protruding portions 131 that protrude from the bottom surface of the recessed portion 130 are formed as impressions of the two notches 111c formed in the peripheral wall portion 111b. The recessed portion 130 is a generally circular groove. The protruding portions 131 are protrusions that are generally rectangular when viewed from above.

Here, the diameter of the inside of the recessed portion 130 is equal to the inner diameter of the peripheral wall portion 111b of the first mounting member 111. Therefore, the inner diameter of the peripheral wall portion 111b can be known based on the shape and dimensions of the recessed portion 130, even without looking at the insert molding apparatus 100. On the other hand, the diameter of the inside of the recessed portion 130 is smaller than the outer diameter of the second end portion 12c of the second type of nut 12 that is embedded in the insert molded article 10. The shape and dimensions of the recessed portion 130 indicate that if the second type of nut 12 were to be arranged on the first placement portion 121, the tip end surface of the peripheral wall portion 111b would contact the end surface of the second end portion 12c of the second type of nut 12 without the second end portion 12c of the second type of nut 12 fitting together with the peripheral wall portion 111b, such that the wrong-assembly detection gap 135 would be formed to the inside of the peripheral wall portion 111b. Also, the shape and dimensions of the protruding portion 131 correspond to the notches 111c in the peripheral wall portion 111b. Therefore, the shape and dimensions of the notches 111c in the peripheral wall portion 111b are able to be known even without looking at the insert molding apparatus 100. The shape and dimensions of the recessed portion 130 indicate that the wrong-assembly detection gap 135 is connected via the notches 111c to the space into which the molten resin is injected.

<Method for Detecting Wrong Assembly of an Insert Nut>

Figure 7:
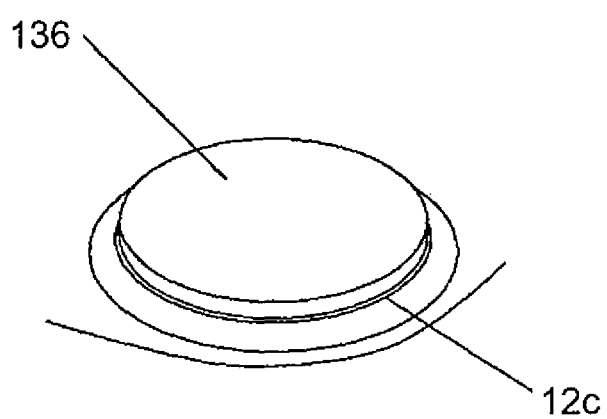
FIG. 7 is a perspective view of a corner portion of the insert molded article when the insert nut is wrongly assembled.

Continuing on, a method for detecting wrong assembly when the insert nuts 11 and 12 are wrongly assembled in the placement process of the insert molding method will be described. FIG. 7 is a perspective view of a corner portion of the insert molded article 10 when the insert nuts 11 and 12 are wrongly assembled. Hereinafter, a case will be described in which the second type of nut 12 is mistakenly assembled to the first placement portion 121 to which the first type of nut 11 should be assembled.

In this case, in the placement process, the first end portion 12b of the second type of nut 12 is fitted into the first placement portion 121. In this state, even if a worker looks at the second type of nut 12 that is wrongly assembled, the height and outer diameter of the end portion of the second type of nut 12 are only slightly different than they are with the first type of nut 11, so the worker may not notice the wrong assembly. Then the first mounting member 111 will be mounted to the second end portion 12c of the second type of nut 12.

However, as described above, the inner diameter of the peripheral wall portion 111b of the first mounting member 111 is set such that the second end portion 12c of the second type of nut 12 is unable to fit. Therefore, in the injection process, the tip end surface of the peripheral wall portion 111b of the first mounting member 111 contacts the end surface of the second end portion 12c of the second type of nut 12, and the first mounting member 111 rides on the second type of nut 12, as shown in FIG. 5. The wrong-assembly detection gap 135 is formed between the main body portion 111a of the first mounting member 111 and the end surface of the second end portion 12c of the second type of nut 12. The wrong-assembly detection gap 135 is connected via the notches 111c to the space inside the forming die 101 into which molten resin is injected. Therefore, molten resin that has been injected into the forming die 101 when the injection process is performed flows inside the second type of nut 12 and the wrong-assembly detection gap 135 through the notches 111c. The wrong-assembly detection gap 135 is filled with molten resin. As a result, in the insert molded article 10 after the die-opening process, the end surface of the second end portion 12c of the second type of nut 12 is covered by resin 136, as shown in FIG. 7. Also, the recessed portion 130 that forms when the first type of nut 11 is assembled to the first placement portion 121 will not form around the second type of nut 12. When the end surface of the second end portion 12c of the second type of nut 12 is covered by the resin 136, a worker is easily able to visually notice it. Also, whether the end surface of the second end portion 12c of the second type of nut 12 is covered is also able to be easily determined using an imaging device such as a camera. Therefore, wrong assembly of the insert nuts 11 and 12 is able to be easily detected.

When the first type of nut 11 is wrongly assembled to the second placement portion 122, the first type of nut 11 is higher than the second type of nut 12, so the bus bar 15 will bend when it (i.e., the bus bar 15) is mounted to the upper side of the first type of nut 11. Therefore, wrong assembly can be detected relatively easily when the placement process is performed.

Other Example Embodiments

The example embodiment described above may also be structured as follows.

In the example embodiment described above, both the shape and size of different types of specific insert parts (i.e., insert nuts) are different. However, it is sufficient that at least one of the shape and the size be different among different types of specific insert parts.

Also, in this example embodiment, the peripheral wall portion 111b is formed along the entire periphery of the first mounting member 111, but the peripheral wall portion 111b may also be formed on only a portion of the first mounting member 111 as long as the wrong-assembly detection gap 135 is formed by the tip end surface of the peripheral wall portion 111b abutting against the end surface of the second end portion 12c of the second type of nut 12. In this case, the notches 111c may be cut out from the side instead of the tip end of the peripheral wall portion 111b. Further, the notches 111c need only to connect the wrong-assembly detection gap 135 to the space into which molten resin is injected from outside of the forming die 101. That is, a hole through the first mounting member 111 or a cutout formed along the peripheral wall portion 111b on the wrong-assembly detection gap 135 side of the peripheral wall portion 111b or the like may be used instead of the notches 111c.

Also, in the example embodiment described above, the insert molded article may be a resin molded article other than a case for an electronic control unit (ECU).

Also, in this example embodiment described above, the specific insert parts for which a plurality of types of parts are used may be parts (e.g., rod-shaped parts) other than insert nuts.

The invention may be applied to an insert molded article in which a plurality of types of parts are used for specific insert parts, an insert molding method for manufacturing this insert molded article, and an insert molding apparatus used in this insert molding method, and the like.

What is claimed is:

1. An insert molding apparatus comprising:
a forming die including an upper die and a lower die, configured to integrally mold a resin article with a plurality of insert parts including a first insert part and a second insert part, wherein the first insert part has a different shape and dimension than the second insert part, and the first insert part and the second insert part are fitted in the lower die;
a fill port formed in the upper die into which molten resin is supplied; and
a first mounting part disposed at a location in the upper die that is spaced apart from the fill port and that contacts an end surface of the first insert part or the second insert part when the forming die is in a closed position, wherein, when the first mounting part contacts the second insert part in the closed position of the forming die, a gap is formed between a surface of the first mounting part and the second insert part so as to form a passage into which the molten resin flows and wherein, when the first mounting part contacts the first insert part in the closed position of the forming die, a gap is not formed between the surface of the first mounting part and the first insert part.

2. The insert molding apparatus according to claim 1, wherein the lower die is configured to hold each of the first insert part and the second insert part so that after the molten resin is solidified in the forming die, an exposed portion of the second insert part differs in shape from an exposed portion of the first insert part, further comprising:
a second mounting part disposed at a location in the upper die that is spaced apart from the fill port and that contacts the end surface of the first insert part or the second insert part when the forming die is in the closed position.

3. The insert molding apparatus according to claim 1, wherein
the first mounting part includes a peripheral wall portion that contacts a side surface of the first insert part that has a cylindrical shape, and a main body portion that contacts an upper surface of the first insert part that has the cylindrical shape; and
the passage is provided in the peripheral wall portion.

4. The insert molding apparatus according to claim 1, wherein the passage is a notch.

5. The insert molding apparatus according to claim 1, wherein
the first mounting part includes a peripheral wall portion that provides the passage, and a main body portion;
a tip end surface of the peripheral wall portion contacts an end surface of the first insert part to form a gap between an inside surface of the main body portion and the end surface of the first insert part; and
the passage connects the gap and a space in the forming die into which the molten resin is supplied via the fill port.

6. An insert molding apparatus comprising:
a forming die including an upper die and a lower die, wherein the lower die is configured to hold a first insert part that has a cylindrical shape and a second insert part that has a cylindrical shape, and wherein the forming die is configured to mold resin to form a resin case such that a portion of the first insert part protrudes from the resin case and a portion of the second insert part protrudes from the resin case;
a first mounting part located in the upper die, the first mounting part comprising:
a main body portion that contacts an upper surface of the first insert part that protrudes from the resin case; and
a peripheral wall portion that contacts a side surface of the first insert part that protrudes from the resin case, and that provides a passage into which the molten resin is supplied; and
a second mounting part located in the upper die and configured to contact the second insert part,
wherein a shape of the protruded portion of the second insert part differs from a shape of the protruded portion of the first insert part; and
wherein the second mounting part contacts the protruded portion of the second insert part.

* * * * *